United States Patent [19]

Adini

[11] Patent Number: 4,719,802

[45] Date of Patent: Jan. 19, 1988

[54] DEVICE FOR AND METHOD OF DETERMINING CHANGES IN LINEAR DIMENSION OF OBJECTS

[76] Inventor: Ari Adini, 104-20 Queens Blvd. #22J, Forest Hills, N.Y. 11375

[21] Appl. No.: 61,090

[22] Filed: Jun. 12, 1987

[51] Int. Cl.[4] .............................................. G01B 7/16
[52] U.S. Cl. ........................................ 73/763; 73/766
[58] Field of Search ................. 73/775, 782, 763, 764, 73/765, 766, 767, 774, 777, 781; 338/6

[56] References Cited

U.S. PATENT DOCUMENTS 3,782,182  1/1974  Starr ..................................... 73/782
3,791,205  2/1974  Hooker ............................. 73/782 X Primary Examiner—Jerry W. Myracle
Attorney, Agent, or Firm—Ilya Zborovsky

[57] ABSTRACT

Changes in linear dimension of objects are determined by measuring strains caused in an electrical resistance strain gauge which is attached to an elongated element with a high modulus of elasticity provided on at least one end of an elongated body with a low modulus of elasticity extending in the direction of linear dimension of the object.

14 Claims, 9 Drawing Figures

DEVICE FOR AND METHOD OF DETERMINING CHANGES IN LINEAR DIMENSION OF OBJECTS

BACKGROUND OF THE INVENTION

The present invention relates to a device for and a method of determining changes in a linear dimension of objects.

Devices and methods of this general type are known in the art. However, they do not use strain gauges, since the strain gauges are made to measure strains at a point or practically over a very small size area. They cannot be made to measure actual elongation of an object, and in particular of such an object which for example has a gap between two adjacent parts.

SUMMARY OF THE INVENTION

Accordingly, it is an object of the present invention to provide such a device and a method for determining changes in a linear dimension of an object, which avoid the disadvantages of the prior art.

In keeping with these objects and with others which will become apparent hereinafter, one feature of the present invention resides, briefly stated, in a device and a method in accordance with which an elongated body having a relatively low modulus of elasticity is attachable to an object along its linear dimension, at least one elongated element is attached to the body and extends in the same direction over a part of its length and has a relatively high modulus of elasticity, and electrical measuring means is connected with an electrical resistance strain gauge which is provided on the element. Thereby, when the linear dimension of the object changes, the body expands or contracts and induces stresses in the element thus causing strains in the gauge, which strains are measured by the measuring means and indicate the changes in the linear dimension of the object.

When the device is designed and the method is performed in accordance with the present invention, the strain gauges are used for the first time for determination of linear changes in objects and provide for very accurate results of measurements.

The novel features of the present invention are set forth in particular in the appended claims. The invention itself, however, both as to its construction and its manner of operation will be best understood from the following description of preferred embodiments which is accompanied by the following drawings.

DESCRIPTION OF PREFERRED EMBODIMENTS

Figure 1:
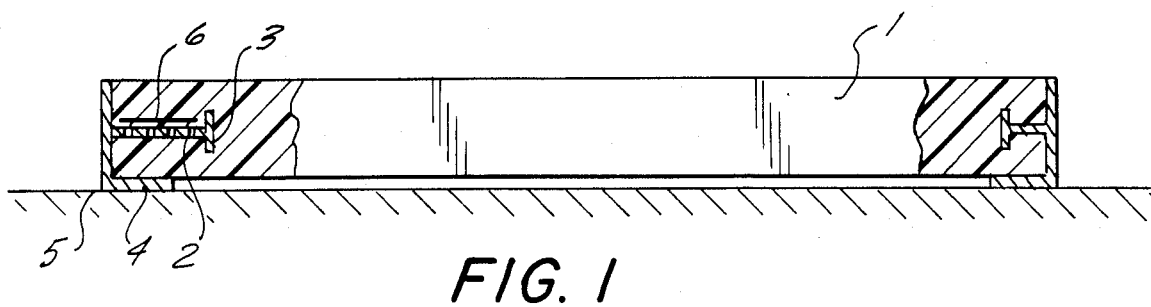
FIG. 1 is a side view of a device for determining changes in a linear dimension of objects, in accordance with the present invention.
Figure 2:
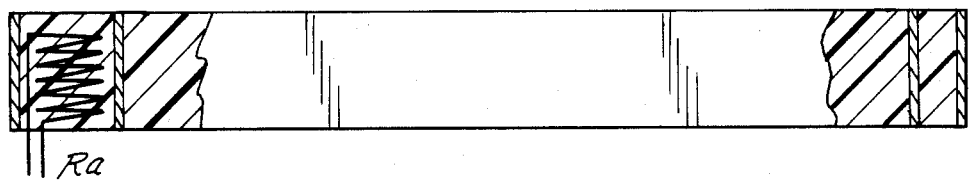
FIG. 2 is a plan view of the inventive device of FIG. 1.
Figure 3:
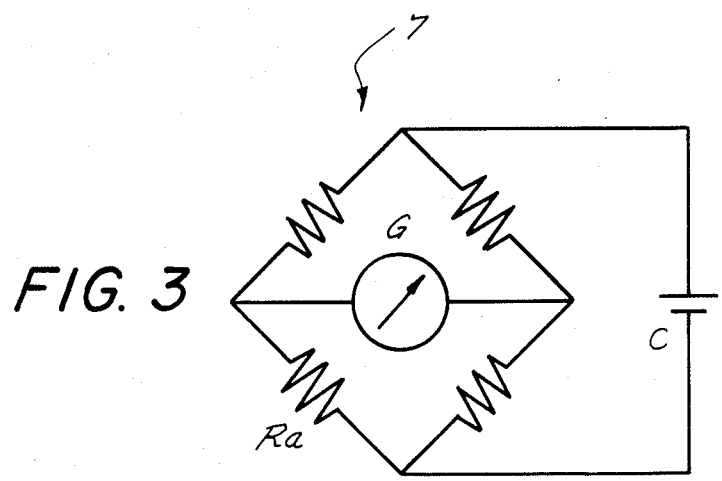
FIG. 3 is a view schematically showing electrical measuring means of the device of FIG. 1.

A device for determining changes in linear dimension of an object, in accordance with one embodiment of the invention is shown in FIGS. 1–3. The device includes an elongated body 1 which is composed of a material having a relatively low modulus of elasticity $E_1$, for example of a rigid plastic material such as cast neoprene. The elongated body 1 is attachable at its ends to an object whose changes in linear dimension are to be measured. More particularly, it is attached in a manner which will be explained in detail hereinbelow. The elongated body 1 extends in the direction of the linear dimension and covers a certain length of the object. If the object has a gap, the elongated body 1 extends over the gap and at both sides of the latter.

At least one end of the elongated body 1 is provided with an elongated element 2 which is composed of a material having a relatively high modulus of elasticity $E_2$, for example of a respective metal such as stainless steel. The elongated element 2 also extends in the direction of the linear dimension. More particularly, it is embedded in the body 1 at its one end. The elongated element 2 is connected with an extension 3 extending into the body 1 and with a seat 4, and made advantageously of one piece with the same.

The seat 4 of the elongated element 2 on one end, and a seat 4' on the other end of the body 1 are firmly connected to the object, for example by an epoxy glue layer such as metyl-2 cyanoacrylate, which is identified with reference numeral 5.

An electrical resistance strain gauge 6 is arranged on the elongated element 2 and attached to the same by known means. The strain gauge 6 is connected with an electrical measuring means formed as a standard Whitstone bridge 7. The strain gauge 6 ($R_a$) forms a quarter of the bridge, whereas three other gauges are standard reference non-varying electrical resistances.

The device of FIGS. 1–3 operates in the following manner: As a result of changes in length over the span "L" between two end points, the material of the body 1 expands or contracts exerting a force on the fixed ends. That force induces stresses in the elongated element 2 thus causing strains which are measured by the bridge 7. If the cross sectional area of the element 2 is "a" and the cross sectional area of the body 1 is "A", then the change in the dimension "L" will be:

$$\Delta L = e \frac{E_2 \cdot a}{E_1 \cdot A} \cdot L$$

where "e" is the measured strain as indicated by a galvanometer G when the bridge 7 is energized by a current C.

Figure 4:
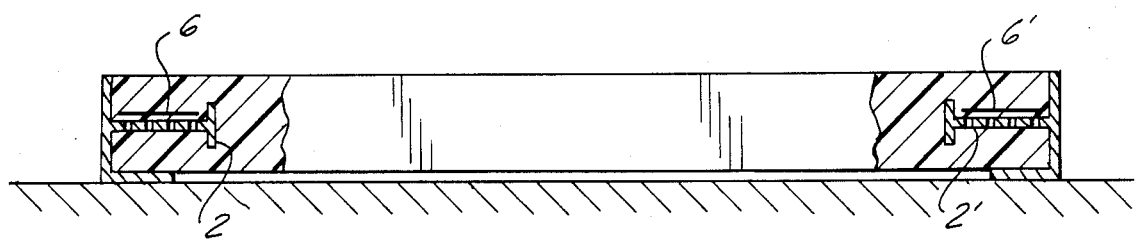
FIGS. 4, 5 and 6 are views substantially corresponding to the views of FIGS. 1, 2 and 3, but showing a device in accordance with another embodiment of the invention.
Figure 5:
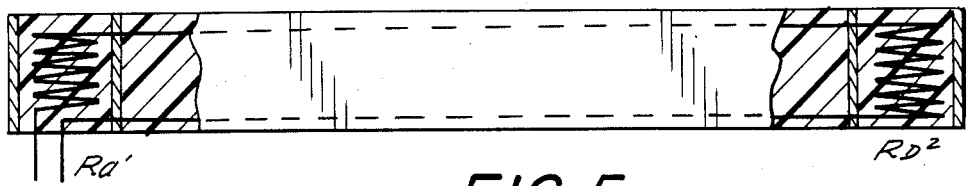
Figure 6:
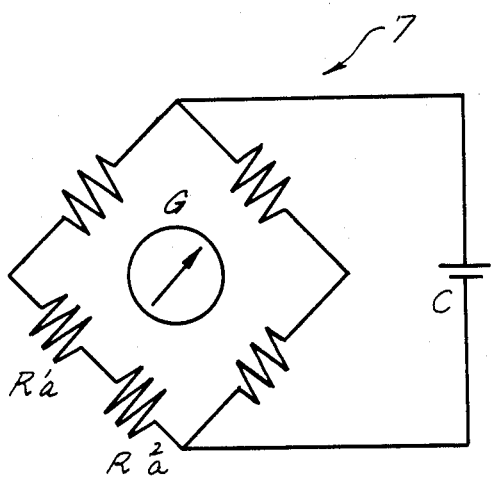

FIGS. 4–6 show another modification of the invention, which provides for a higher accuracy. Here, two strain gauges 6 and 6' are arranged on two elements 2 and 2' provided at both ends of the body 1. The bridge 7' has two strain gauges 6 ($Ra^1$) and 6' ($Ra^2$) in its one quarter, connected in series. The change in the linear dimension in the device of FIGS. 4–6 will be $$\Delta L = \frac{1}{2} e \frac{E_2 \cdot a}{E_1 \cdot A} \cdot L$$

Figure 9:
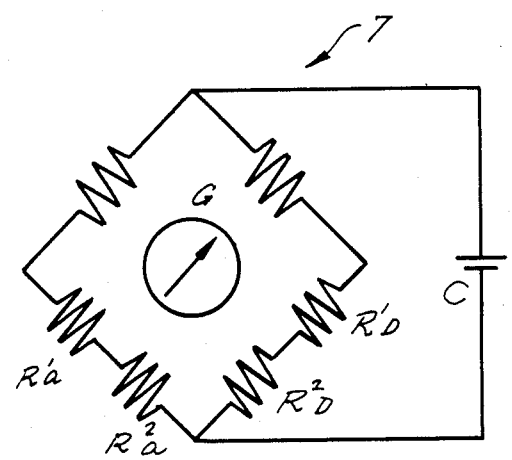
FIGS. 7, 8 and 9 are views substantially corresponding to the views of FIGS. 1, 2 and 3, but showing a further embodiment of the inventive device.
Figure 7:
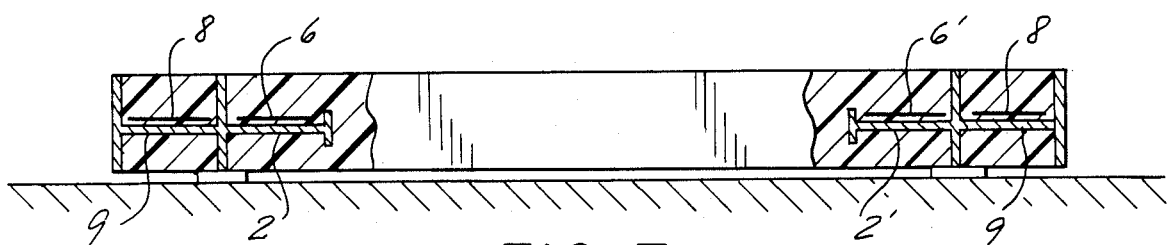
Figure 8:
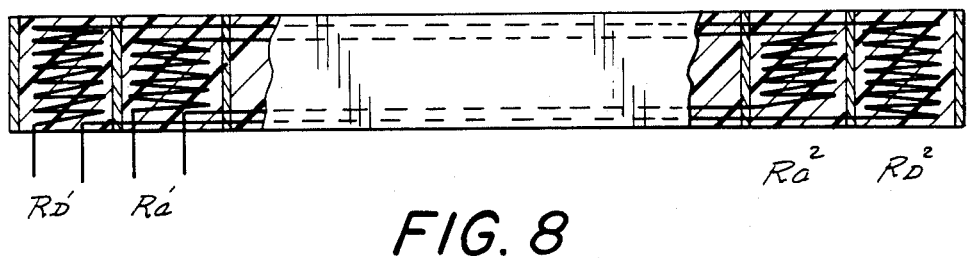

The device in accordance with a further embodiment shown in FIGS. 7–9 provides for compensation of effects of temperature variations during the period of measurements. For this purpose, dummy gauges 8 are added behind the points of fixed connection to the object. They are arranged on additional elongated elements 9 which can be formed of one piece with the elements 7, extensions 3 and seats 4. In this device one half of the bridge 7" is connected with the active gauges 6,6' and dummy gauges 8, while the other half of the bridge includes reference constant resistances.

The invention is not limited to the details shown since various modifications and structural changes are possible without departing in any way from the spirit of the invention.

What is desired to be protected by Letters Patent is set forth in the appended claims.

I claim:

1. A device for determining changes in a linear dimension of an object, comprising
    an elongated body composed of a material having a relatively low modulus of elasticity and having a predetermined length, said body having two ends spaced from one another in direction of elongation and being attachable to an object so that it extends along a linear dimension of the object,
    at least one elongated element composed of a material having a relatively low modulus of elasticity and having a length which is smaller than the length of said body, said element being attached to one of said ends of said body so as to extend in the direction of elongation of the latter;
    an electrical resistance strain gauge provided on said element; and
    electrical measuring means connected with said strain gauge so that when the linear dimension of the object changes, said body expands or contracts and induces stresses in said element thus causing in said gauge strains which are measured by said measuring means and are indicative of the changes in the linear dimension of the object.

2. A device as defined in claim 1; and further comprising a second such elongated element attached to the other of said ends of said body; and a second such electrical resistance strain gauge provided on said second element, said electrical measuring means being connected with both said strain gauges so as to measure average strains in both said gauges for improving accuracy of the measuring.

3. A device as defined in claim 1; and further comprising means for compensating temperature variations and including at least one dummy gauge, said measuring means being connected with said dummy gauge of said compensating means.

4. A device as defined in claim 3, wherein said body being attachable to the object at said ends each in a predetermined point, said first mentioned gauge being located inwardly of said point and said dummy gauge being located outwardly of said point at said one end, as considered in said direction.

5. A device as defined in claim 1; and further comprising an extension with said element and extending into said body; and a seat provided in each of said ends of said body and attachable to the object, said element together with said extension and with one of said seats provided at said one end together forming a one piece unit.

6. A device as defined in claim 4; and further comprising another element to which said dummy gauge is attached; an extension connected with said first mentioned element and extending into said body; and a seat provided in each of said ends and attachable to the object, said first-mentioned element and the other element together with said extension and one of said seats provided in said one end together forming a one piece unit.

7. A device as defined in claim 1, wherein said body is composed of a plastic material having a relatively low modulus of elasticity.

8. A device as defined in claim 7, wherein said body is composed of cast neoprene.

9. A device as defined in claim 1, wherein said element is composed of a metal having a relatively high modulus of elasticity.

10. A device as defined in claim 9, wherein said element is composed of stainless steel.

11. A device as defined in claim 1; and further comprising means for attaching said body to an object and including at least two attaching elements provided at each of said ends of said body for attaching said ends of said body to the object.

12. A device as defined in claim 11, wherein each of said attaching element is formed as an adhesive element bendable both with a respective one of said ends of said body and with the object.

13. A device as defined in claim 12, wherein each of said attaching elements is formed by a layer of glue.

14. A method of determining changes in a linear dimension of an object, comprising the steps of
    attaching to an object an elongated body composed of a material with a relatively low modulus of elasticity so that it extends along a linear dimension of the object;
    attaching an element composed of a material having a relatively high modulus of elasticity to at least one end of the body and so that it also extends in said direction;
    providing an electrical resistance strain gauge on the element; and
    connecting the gauge with electrical measuring means so that when the linear dimension of the object changes, the body expands or contracts and induces in stresses in the element thus causing in the gauge strains which are measured by the measuring means and are indicative of the changes in the linear dimension of the object.

* * * * *